R. A. WOOD.
DIEING MECHANISM FOR BOX MAKING MACHINES.
APPLICATION FILED OCT. 31, 1914.
Patented June 8, 1915.
3 SHEETS—SHEET 3.
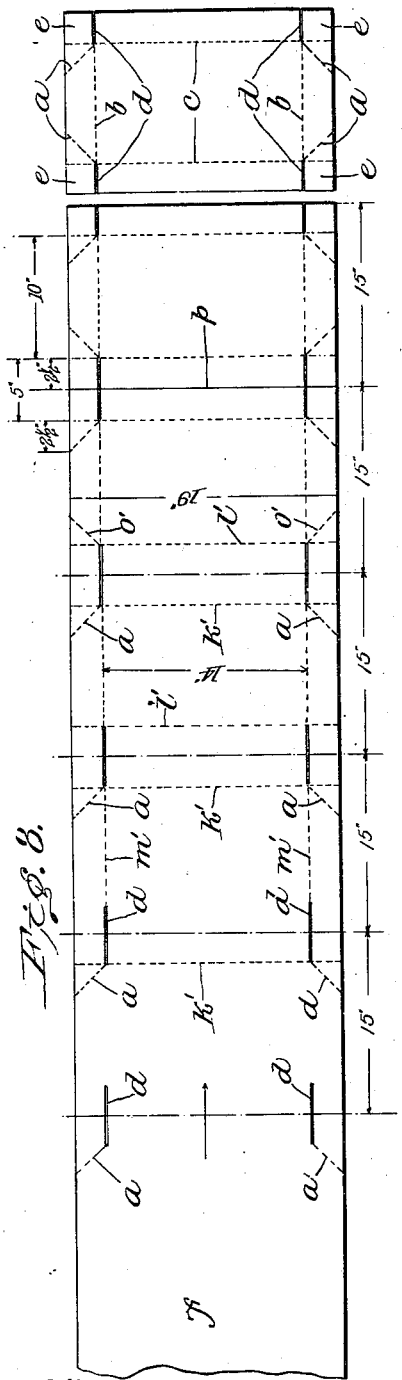
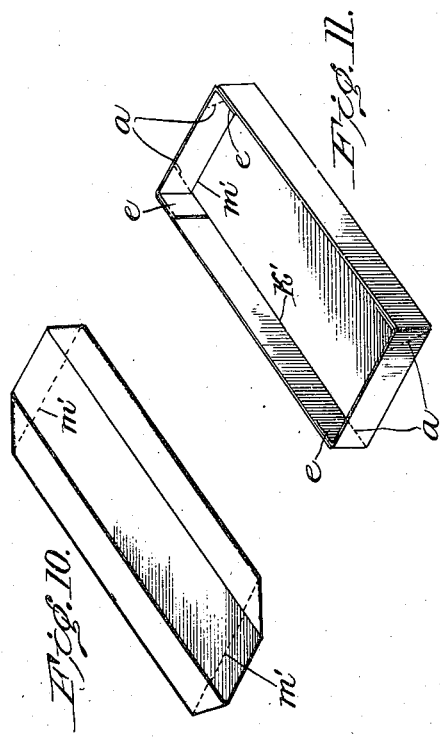
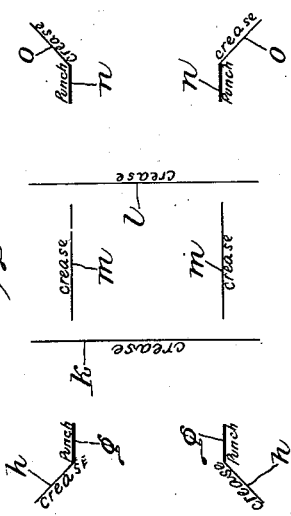
Inventor
Ralph A. Wood
by Foster Freeman Watson
Attorneys
Witnesses
G. F. Baker
B. M. Kent

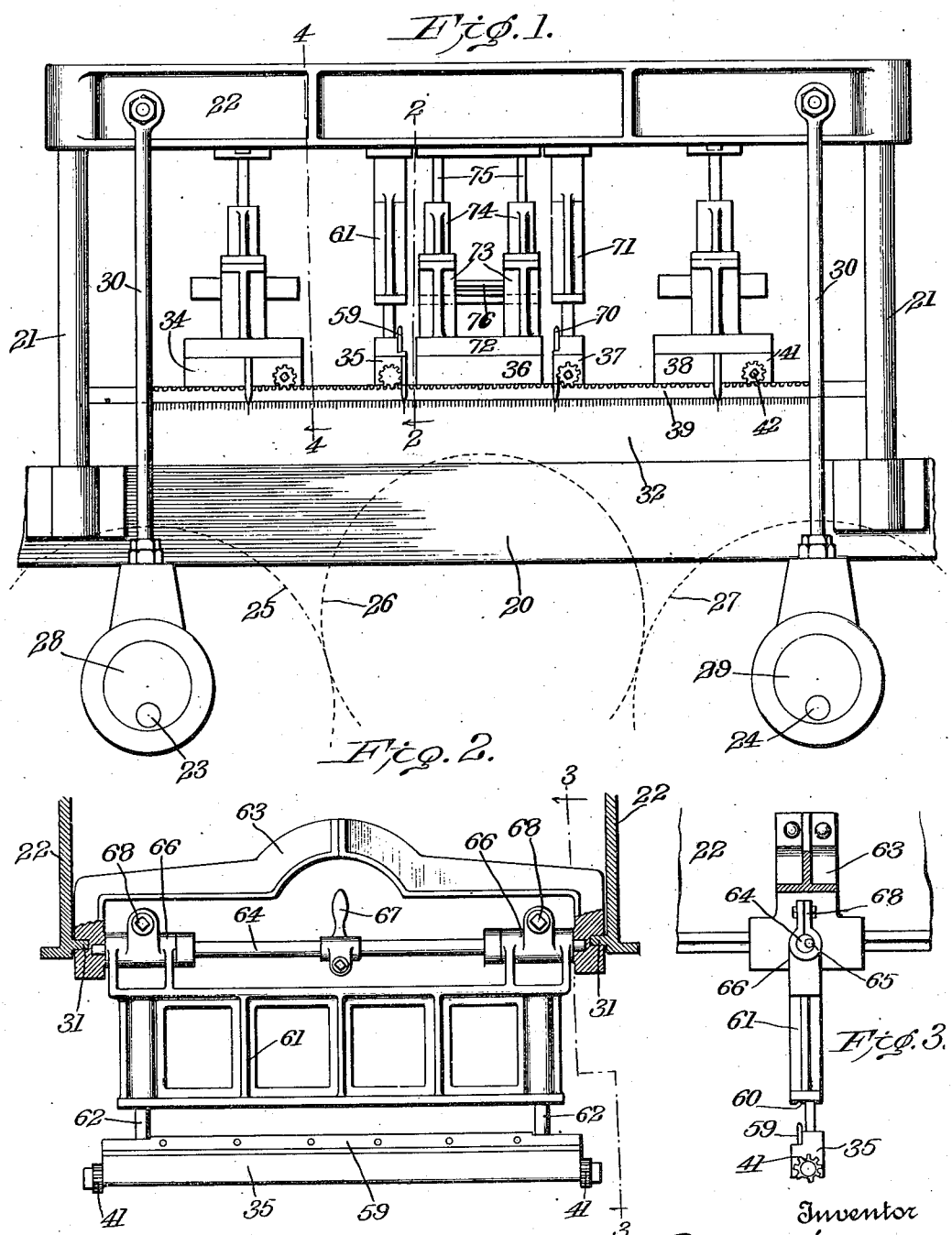

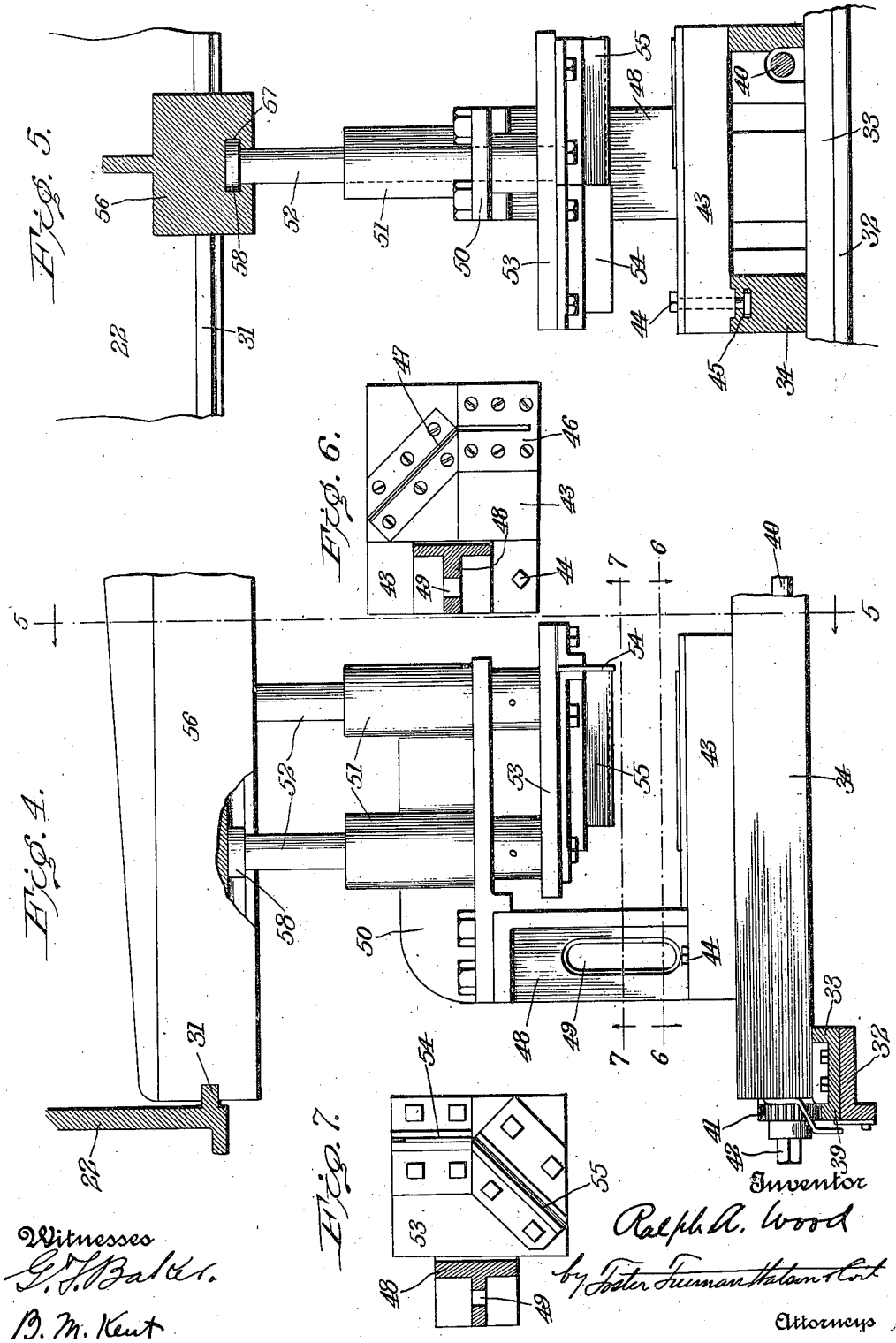

UNITED STATES PATENT OFFICE.

RALPH A. WOOD, OF AMSTERDAM, NEW YORK, ASSIGNOR TO INMAN MANUFACTURING COMPANY, INC., OF AMSTERDAM, NEW YORK, A CORPORATION OF NEW YORK.

DIEING MECHANISM FOR BOX-MAKING MACHINES.

1,142,654.  Specification of Letters Patent.  Patented June 8, 1915.

Application filed October 31, 1914. Serial No. 869,667.

*To all whom it may concern:*

Be it known that I, RALPH A. WOOD, a citizen of the United States, residing at Amsterdam, Montgomery county, State of New York, have invented certain new and useful Improvements in Dieing Mechanism for Box-Making Machines, of which the following is a specification.

This invention relates to box-blank making machines and more particularly to dieing mechanism therefor.

It is the object of the invention to provide dieing mechanism for making blanks for collapsible trays and the invention has particular reference to providing simple adjustments whereby blanks of various sizes may be made with the same set of dies.

A further object of the invention is to provide a comparatively simple dieing mechanism which is adapted to operate on an intermittently moving web of material to progressively form the blanks.

The novel features of the invention will be apparent from the following description taken in connection with the accompanying drawings, in which, Figure 1 is a side elevation of a machine embodying the invention; Fig. 2 is a section on the line 2—2 of Fig. 1; Fig. 3 is a section on the line 3—3 of Fig. 2; Fig. 4 is an enlarged transverse section on the line 4—4 of Fig. 1; Fig. 5 is a section on the line 5—5 of Fig. 4; Fig. 6 is a section on the line 6—6 of Fig. 4, on a reduced scale; Fig. 7 is a section on the line 7—7 of Fig. 4, on the same scale as Fig. 6; Fig. 8 is a plan view of a web of material and a completed blank; Fig. 9 is a diagram showing the arrangement of the dies; Fig. 10 is a perspective view of a collapsed tray; Fig. 11 is a perspective view of the completed tray.

Referring to Figs. 10 and 11, it will be seen that the tray has the usual side and end walls and the end walls are provided with diagonal creases $a$ which permit the end walls to be spread out into the plane of the bottom of the tray, as shown in Fig. 10, the sides folding over the bottom to make a practically flat article which is in convenient form for storage and transportation. When it is desired to use the tray, the ends and sides are turned up to the position shown in Fig. 11 and when two trays are telescoped to form a box, each tray coöperates with the other to prevent the sides and ends from collapsing.

The blank from which the trays are made is shown at the right in Fig. 8 and it will be observed that this blank has, in addition to the diagonal-creases $a$, the creases $b$, which extend longitudinally of the web from which the blanks are formed, and the cross-creases $c$. The blank is also provided with openings or slots $d$, which form the laps $e$, these laps being pasted to the inner side of the side walls, as shown in Fig. 11.

In forming the blanks the web $f$ is fed through the machine and is operated upon by the different dies, in succession, the web being advanced the length of the blank after each operation of the dies. From Fig. 9 the arrangement of the dies will be evident. In this arrangement the punches $g$ make the openings $d$ appearing at the left side of Fig. 8. Each of these punches has in coöperation therewith and extending from the end thereof a creaser $h$ which makes one of the diagonal-creases $a$. The broken line extending across the web in Fig. 8 at the left side thereof indicates the line upon which the cut is eventually made to separate the finished blank from the web and in the illustration there is shown a blank which is 15 inches long and after each operation of the dies the web is advanced this distance. It will be observed that there is a series of broken lines extending across the web in Fig. 8 and indicated as being 15 inches apart. After the web has been advanced 15 inches the next operation of the dies causes the cross-creaser $k$ to make the crease $k'$ shown in Fig. 8, this crease being located at the intersection of the openings $d$ and the creases $a$. After this operation of the dies the web is again advanced and on the next operation of the cross-creaser $l$ makes the crease $l'$. The longitudinal-creasers $m$ make the creases $m'$ and following the next advance of the web the punches $n$ either register with the openings $d$ made by the punches $g$ or, if they do not register with these openings, lengthen the openings $d$. It will thus be seen that the punches $n$ and $g$ coöperate to form the openings $d$ and the length of these openings may be varied from the length of one of the punches to the full length of the two punches. The punches $n$ have extending diagonally therefrom the creasers o which make the remaining two of the diagonal-creases a in the web. This completes the blank and subsequently it is severed from the web along the line p, shown in Fig. 8.

While the dies operate on each blank in succession, it will be understood that in the machine, as about to be described, all of the dies act simultaneously.

Referring to Figs. 1 to 7, it will be observed that there is illustrated a frame 20 which carries the vertical guides 21 for reciprocating the head 22. Arranged below the frame 20 and supported in any suitable manner are shafts 23 and 24 which are preferably geared together by a train of gears 25, 26 and 27 so that the shafts rotate in unison. In Fig. 1 one side of the machine is illustrated and it will be understood that, in the preferred form of my invention, the opposite side of the machine is similarly arranged and each of the shafts 23 carries eccentrics, one of which on the shaft 23 is indicated at 28 and one on the shaft 24 at 29. Each of these eccentrics is operatively connected with the head 22 by an eccentric rod 30 so that, in the form of the invention illustrated, there are four of these eccentric rods, arranged adjacent the corners of the head 22, for reciprocating the head. As shown in Figs. 2 to 5, the head 22 has on opposite sides thereof interiorly arranged tongues or slides 31 which support cross beams which carry the moving parts of the dies.

The frame 20 carries a bed 32 upon which are arranged slideways 33 for the die carriers 34, 35, 36, 37 and 38. The slideways 33 are preferably provided with racks 39 and each of the die carriers is provided with a shaft 40, extending crosswise of the machine, and having gear wheels 41 which mesh with the racks 39 so that when these shafts are rotated by means of a suitable wrench applied to the ends 42 of the shafts the die carriers may be conveniently adjusted longitudinally of the machine.

The die carrier 34 carries the punches g and creasers h, shown diagrammatically in Fig. 9, and the die carrier 38 carries the punches n and the creasers o. These sets of punches and creasers are substantially alike except that they are oppositely arranged and therefore a description of one set of these dies will be sufficient for an understanding of the same.

Figs. 4 to 8 illustrate the dies for making one of the punches d and the adjacent crease a in the web, these dies comprising a plate 43 which is slidable transversely of the machine on the carrier 34 and which is secured in position on the carrier by means of the usual bolt 44, the head of which engages a T slot 45 in the carrier. The plate 43 carries the slotted die plate 46 and the male member 47 of the creasing dies. The plate 43 has an upright bracket 48 provided with an opening 49 to permit the bracket to be conveniently grasped by the hand of the operator to move the dies crosswise of the machine. The bracket 48 has secured thereon an inwardly projecting arm 50 which is provided with bosses 51 in which are slidably arranged the rods 52 which carry at their lower ends a plate or head 53. Secured to the under side of the plate 53 is a punch 54 and the female member 55 of the creasing dies, these parts being secured to the head 53 in any suitable manner.

The tongues 31 on the head 22 have slidably arranged thereon cross beams, one of which is shown at 56. The cross beam 56 is provided at the bottom thereof with a T slot 57 extending crosswise of the machine and in this T slot the heads 58 of the rods 52 are arranged. The cross beam 56 reciprocates with the head 22 and the rods 52 are reciprocated by the cross beam, the connection between the rods 52 and the cross beam permitting the rods to move crosswise of the machine with the dies without disturbing their operative connection with the cross beam. The cross beam being slidable longitudinally of the machine on the tongues 31 permits the carrier 34 to be freely adjusted longitudinally of the machine without disturbing the dies or any of their operative mechanism.

The carrier 35 carries the male creasing die 59 which coöperates with the female die 60 carried by a reciprocating head 61. The carrier 35 has the upright posts or guides 62 on which the head 61 reciprocates. The head 61 is carried by a cross beam 63 which is slidable longitudinally of the machine on the tongues 31 and this cross beam has journaled therein a shaft 64.

As will be seen from Fig. 3, the journals 65 of the shaft 64 are eccentrically placed at the ends of the shaft and the purpose of this construction is to permit a close vertical adjustment of the die 60 with relation to the die 59. The head 61 has arranged thereon brackets 66 having split bearings which engage the shaft 64. The shaft 64 is provided with a handle 67 and by means of this handle the shaft may be rotated to raise or lower the head 61 for the purpose of adjusting the relation of the dies. It will be understood that it is necessary to loosen the clamping bolts 68 in order to effect this adjustment.

The die carrier 37 carries a male creasing die 70 and the reciprocating head 71 carries a female die coöperating therewith. These dies constitute the creaser l and their construction and operation is similar to that just described in connection with the dies 59 and 60.

The carrier 36 carries at the opposite ends thereof plates 72 having upright brackets 73 each of which is provided with a cross beam 74 which guides the vertically reciprocating rods 75, the latter being similar to the rods 52 and supporting a head 76 which carries a female creasing die. This female creasing die coöperates with a male die on the plate 72 and these dies together constitute the creasers m for forming the longitudinal creases in the web. It is believed that a detailed description of these creasers is unnecessary because their construction and operation is generally similar to the mechanism described in connection with the diagonal creasers 55.

From the foregoing it will be understood that each of the die carriers is adjustable longitudinally of the machine independently of the others and that these adjustments may be effected without disturbing the operating connection with the head 22.

From Fig. 9 it will be evident that boxes of various sizes may be made by adjusting the carriers longitudinally of the machine and the dies on the carriers transversely or crosswise of the machine. It will also be understood that the punch n may be set to register with the opening made by the punch g or may be set so as to lengthen the opening made by the punch g and since each of the punches has in fixed relation thereto one of the diagonal creasers it will be evident that the diagonal creases will always be properly placed in the web and it is only necessary to adjust the relation of the punches to make the desired blank.

It will be evident that the details of construction which have been illustrated may be changed and therefore I do not wish to be limited to these details of construction.

Having thus described the invention what is claimed is:

1. In a machine of the class described, the combination of longitudinal-creasing means, cross-creasing means, a cutter, and diagonal-creasing means extending from said cutter, said cutter and said cross-creasing means being adjustable and the cutter and diagonal-creasing means being adjustable, as a unit.

2. In a machine of the class described, the combination of longitudinal-creasing means, cross-creasing means, a plurality of cutters, and diagonal-creasing means extending from said cutters, said cross-creasing means being relatively adjustable and each of said cutters being adjustable with a diagonal-creasing means, as a unit.

3. In a machine of the class described, the combination of longitudinal-creasing means, cross-creasing means, a plurality of cutters alined longitudinally of the machine and coöperating to make a continuous opening in the material, and diagonal-creasing means extending from each of said cutters, said cross-creasing means being relatively adjustable and each of said cutters being adjustable with the adjoining diagonal-creasing means, as a unit.

4. In a machine of the class described, the combination of longitudinal-creasing means, cross-creasing means, a plurality of cutters alined longitudinally of the machine, and diagonal-creasing means extending from one end of each of said cutters, said cross-creasing means being relatively adjustable and said cutters and the adjoining diagonal-creasing means being adjustable.

5. In a machine of the class described, the combination of longitudinal-creasing means, cross-creasing means, a plurality of cutters alined longitudinally of the machine, and diagonal-creasing means extending from one end of each of said cutters, said cross-creasing means being relatively adjustable and said cutters with the adjoining diagonal-creasing means being relatively adjustable as units.

6. In a machine of the class described, the combination of longitudinal-creasing means, cross-creasing means, a plurality of cutters alined longitudinally of the machine, and diagonal-creasing means extending from one end of each of said cutters, said cross-creasing means being relatively adjustable and said cutters with the adjoining diagonal-creasing means being adjustable longitudinally and transversely of the machine as units.

7. In a machine of the class described, the combination of longitudinal-creasing means, cross-creasing means, four parallel cutters arranged in rectangular formation, and diagonal-creasing means associated with each of said cutters and extending from one end thereof, said cross-creasing means being relatively adjustable longitudinally of the machine, and said cutters and the adjoining diagonal-creasing means being relatively adjustable.

8. In a machine of the class described, the combination of longitudinal-creasing means, cross-creasing means, and a plurality of diagonal-creasing means independently adjustable longitudinally and crosswise of the machine.

9. In a machine of the class described, the combination of longitudinal-creasing means, cross-creasing means, a plurality of diagonal-creasing means, and means whereby said diagonal-creasing means are independently adjustable crosswise of the machine and adjustable in pairs longitudinally of the machine.

10. In a machine of the class described, the combination of longitudinal-creasing means, cross-creasing means, said means being adapted to make intersecting creases, a plurality of diagonal-creasing means adapted to make creases from said intersections, and means whereby all of said creasing means may be adjusted longitudinally and crosswise of the machine.

11. In a machine of the class described, the combination of longitudinal-creasing means, cross-creasing means, said creasing means being adapted to make intersecting creases, diagonal creasing means adapted to make creases extending from said intersections, and a plurality of cutters coöperating to make longitudinal cuts extending between adjacent intersections.

12. In a machine of the class described, the combination of longitudinal-creasing means, cross-creasing means, said creasing means being adapted to make intersecting creases, diagonal creasing means adapted to make creases extending from said intersections, a plurality of cutters coöperating to make longitudinal cuts extending between adjacent intersections, and means whereby said creasing means and said cutters may be adjusted longitudinally and crosswise of the machine.

In testimony whereof I affix my signature in presence of two witnesses.

RALPH A. WOOD.

Witnesses:
 JAMES W. FERGUSON,
 CLARA I. RAWDON.